Patented Feb. 18, 1936

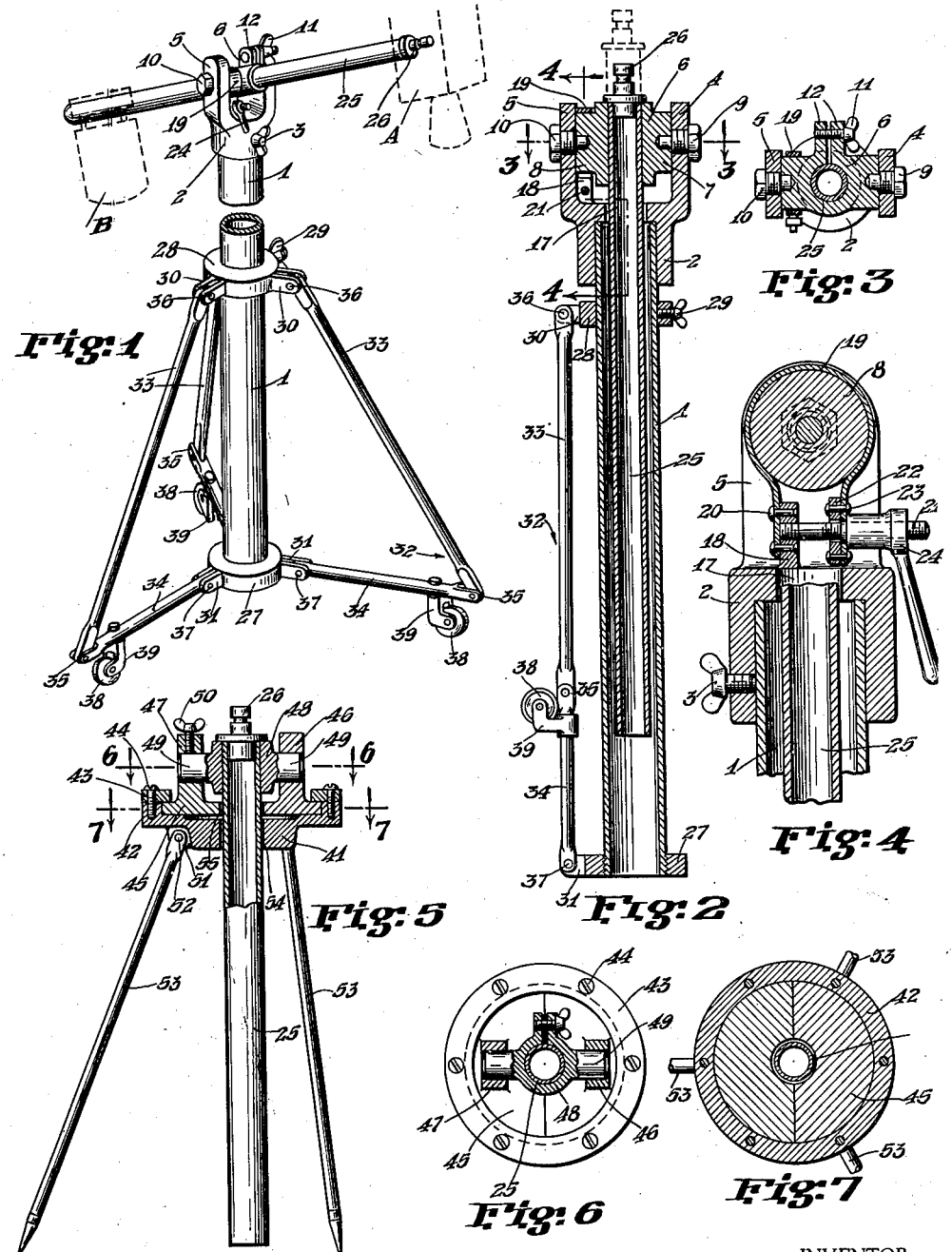

2,031,097

UNITED STATES PATENT OFFICE 2,031,097

STAND FOR X-RAY APPARATUS AND THE LIKE

Gustav Bucky, New York, N. Y.

Application August 6, 1935, Serial No. 34,873

5 Claims. (Cl. 248—123)

The invention relates to a stand for apparatus such as for instance X-ray apparatus, photographic cameras, search lights and the like, in short, for apparatus which are to be adjusted as to direction and height.

The principal object of the invention is the provision of a light stand of great stability.

A further object is the provision of a collapsible stand of high stability which may easily be transported in its collapsed state.

Another object is the provision of a stand which may be adjusted as to the position of the apparatus carried by the stand in a horizontal plane as well as with regard to height.

The invention essentially consists of a stand with a head rotatable about a vertical axis and with an elongated member on which the apparatus may be mounted, said elongated member being pivoted on said head on a horizontal axis and adapted to be moved in its longitudinal direction in relation to its pivotal axis. The invention furthermore consists of a forked stand head, and an elongated member pivoted on said head about a horizontal axis and adapted to be passed through a vertical opening of said head when it is to be brought into the position for transportation.

Other objects will appear from the description hereinafter and the features of novelty will be pointed out in the claims.

In the accompanying drawing Fig. 1 is a perspective view of a stand embodying the invention in its position of use; Fig. 2 is a longitudinal section of the stand in collapsed state for transportation; Fig. 3 is a sectional view along the line 3—3 of Fig. 2; Fig. 4 is a sectional view along line 4—4 of Fig. 2; Fig. 5 is a longitudinal section of another embodiment of the invention; Figs. 6 and 7 are sectional views along lines 6—6 and 7—7 respectively of Fig. 5.

Referring now to the drawing, 1 is a tubular body on top of which a head 2 is rotatably mounted. A screw 3 serves to arrest the head in an adjusted position with respect to the tubular body 1. Head 2 is forked-shaped with the prongs 4 and 5. A holding member or clamp 6 is arranged between these prongs and rotatable about pivot pins 9 and 10 screwed into the prongs and entering into eyes 7 and 8 respectively of the clamp 6. The clamp 6 is provided with two ears 12 and a screw 11 by means of which the clamp may be tightened. Means are provided to prevent the clamp from rotating around the horizontal axis formed by the pivot pins 9 and 10. For this purpose the prong 5 is equipped with a lug 18 to which a brake band 19 is fastened with one of its ends, for instance by means of rivets 20. Brake band 19 encompasses the exterior surface of the eye 8 of clamp 6. The free end of band 19 is fastened for instance by rivets 23 to ring-shaped member 22. A bolt 21 is fastened to lug 18 and passes through member 22. By means of nut 24 screwed on bolt 21, the brake may be so applied as to prevent rotation of clamp 6.

Into clamp 6 an elongated member, for instance, a tube 25, is inserted on which the apparatus to be carried by the stand may be mounted. If the stand is used for an apparatus consisting of more than one part, it is advisable to mount the parts so that their weight is balanced in relation to the axis formed by the pivot bolts 9 and 10. By the dotted lines in Fig. 1 an arrangement is shown in which an X-ray tube A is mounted on the one end of the elongated member 25 which for this purpose is fitted with an attachment 26 while the transformer B, necessary in connection with the X-ray tube, is mounted on the other end. By moving member 25 in relation to clamp 6, the parts A and B may be so adjusted that their weights are balanced. The apparatus mounted in this manner may be adjusted in a horizontal plane by rotation of the head 2 and as to height, by turning the member 25 together with clamp 6 around the pivot bolts 9 and 10. The apparatus is kept in the adjusted position as to height by applying the brake 19 with the help of nut 24, and, in the horizontal plane, by tightening screw 29. In order to prevent undesired movement of member 25 in its own longitudinal direction, clamp 6 may be tightened by means of screw 11.

Means are provided for collapsing the stand when not in use. For this purpose the head 2 is provided with a hole 17 through which the tube 25 may be passed into the interior of the tubular body 1. Fig. 2 shows the stand in this collapsed position. The dotted lines illustrate the tube 25 in a slightly extended position.

For the same purpose the legs 32 of the stand are so arranged that they may be brought into a position with respect to the tubular body 1 in which the entire device requires very little room. Tubular body 1 is provided with a bottom flange 27 and with a movable ring 28. Flange 27 and ring 28 are equipped with lugs 30 and 31 respectively to which the legs are jointed by hinge pins 36 and 37 respectively. The legs consist of an upper part 33 and a lower part 34 articulately jointed at 35. The lower parts 34 of the legs are provided with rollers 38 mounted in brackets 39 which are fastened near the joints 35. If the ring 28 is shifted downward into the position of Fig. 1, the entire stand rests on the rollers 38. Ring 28 may be arrested in this position by means of a screw 29. Thus the stand with the apparatus may be rolled to its place of use. In order to bring the stand in the collapsed position for transportation, the tube 25 may be passed into the tubular body 1 as explained above, and by loosening screw 29 and lifting ring 28 to its topmost position as illustrated in Fig. 2, the legs are stretched so as to lie near to the tubular body 1.

Figs. 5 to 7 illustrate another embodiment of the invention in a simpler form. A body member 41 is provided with a shoulder 42 on top of which ring 43 is fastened by means of screws 44. Body 41 and ring 43 embrace a split head 45 each portion of which is equipped with a prong 46 and 47 respectively. A clamp 48 is mounted in these prongs by means of its pivot studs 49. Tube 25 with attachment 26 is inserted into clamp 48 as it is inserted in clamp 6 in Fig. 1. A screw 50 passing through prong 47 and pressing against stud 49 is adapted to arrest the clamp in its adjusted position. Body 41 and head 45 have holes 54 and 55 respectively through which tube 25 may be passed if the stand is out of use. The body 41 is furthermore equipped with lugs 51 to which legs 53 are hinged by means of hinge pins 52. For transportation of the stand, the legs 53 may be flapped towards tube 25 which has been passed through the holes 54 and 55. In order to make the stand ready for use, the legs 53 will be spread asunder, thereafter tube 25 will be moved upward in clamp 48 until the lower end of tube 25 is free to rotate together with the clamp around the pivot studs 49. Finally tube 25 is moved backward again through clamp 48 in a position similar to that of Fig. 1.

The advantages of the stand embodying the invention are obvious. The possibility of balancing the parts, such as A and B, of the apparatus supported by the stand makes it superfluous to carry along counterweights if apparatus and stand are to be transported. Nevertheless, the apparatus on the stand is equal in movability and ease of handling to a conventional stationary apparatus. The saving of weight by the stand may be figured at about 75 percent in comparison with a stationary apparatus, and the price of the stand is relatively very low since standard material may be used in its manufacture with the exception of only a few special parts.

Various changes in the specific forms shown and described may be made within the scope of the claims without departing from the spirit of the invention.

I claim:

1. A movable stand for X-ray apparatus and the like comprising a head rotatable about a vertical axis and being provided with a hole passing through the head in vertical direction, a holding member supported by said head and adapted to be swung about a horizontal axis, an elongated member carried by said holding member and adapted to be longitudinally moved in relation to said holding member, whereby said elongated member may be inclined in relation to the vertical axis as desired and may be passed at least partly through the hole of said head when in vertical position, and means for holding said elongated member in an adjusted position.

2. A movable stand for X-ray apparatus and the like comprising a hollow head rotatable about a vertical axis, a horizontally pivoted clamp supported by said head, a bar carried by said clamp intermediate its two ends and adapted to be longitudinally moved in relation to said clamp, and to be passed with one of its ends through the hole of said head when in vertical position, means at one end of said bar for the attachment of a part of a given apparatus to be carried thereby, the entire length of the bar protruding from the side of the clamp opposite the end provided with said attachment means being free for the attachment of another part of the given apparatus when in positions other than the vertical whereby the bar with its loads may be completely balanced in relation to the clamp pivot.

3. A movable stand for X-ray apparatus and the like having a hollow body member, a forked head rotatably carried by said body member, and having a hole in the portion between the fork prongs, spreadable legs adapted to support said body member, a clamp mounted in said forked head and rotatable about an axis at right angles to the axis of rotation of said head, a tubular member held by said clamp and adapted to be longitudinally moved in said clamp, whereby the tubular member may be brought in a position in which its larger portion is passed through said hole provided portion of said head so as to lie between said legs put together.

4. A stand as claimed in claim 3, said body member comprising a disc-like member having a ring shoulder at its upper portion and lugs at its lower portion for the attachment of said legs, and a ring member fastened on said ring shoulder, said head being held by said body member and said ring and being rotatable therebetween.

5. A stand as claimed in claim 3 in which said body member consists of a tube with a flange-like portion for the attachment of the legs, and said head has a sleeve-like extension, the upper portion of said tube and said sleeve-like extension being inserted one into the other.

GUSTAV BUCKY.